United States Patent
Na

(10) Patent No.: US 7,644,430 B2
(45) Date of Patent: Jan. 5, 2010

(54) APPARATUS FOR AND METHOD OF CREATING A DEVICE PAGE FOR A DEVICE WHICH DOES NOT SUPPORT A PREDETERMINED PROTOCOL ON A HOME NETWORK

(75) Inventor: Il-ju Na, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 798 days.

(21) Appl. No.: 11/124,110

(22) Filed: May 9, 2005

(65) Prior Publication Data

US 2005/0204392 A1  Sep. 15, 2005

Related U.S. Application Data

(63) Continuation of application No. 09/306,403, filed on May 6, 1999, now Pat. No. 6,993,785.

(51) Int. Cl.
- *H04N 7/16* (2006.01)
- *H04N 7/18* (2006.01)
- *H04N 7/173* (2006.01)

(52) U.S. Cl. .................. 725/80; 725/133; 725/141; 725/153

(58) Field of Classification Search ............ 725/80, 725/133, 141, 153
See application file for complete search history.

(56) References Cited

U.S. PATENT DOCUMENTS

| | | | |
|---|---|---|---|
| 5,862,452 A * | 1/1999 | Cudak et al. | 725/81 |
| 5,883,621 A * | 3/1999 | Iwamura | 725/37 |
| 5,887,193 A | 3/1999 | Takahashi et al. | |
| 5,926,463 A * | 7/1999 | Ahearn et al. | 370/254 |
| 6,219,697 B1 * | 4/2001 | Lawande et al. | 709/221 |
| 6,237,049 B1 | 5/2001 | Ludtke | |
| 6,308,328 B1 | 10/2001 | Bowcutt et al. | |

(Continued)

FOREIGN PATENT DOCUMENTS

JP  9-116819  5/1997

(Continued)

OTHER PUBLICATIONS

Peisel, B. *Designing The Next Step In Internet Appliances* (Mar. 23, 1998), Electronic Design, Penton Publishing, Cleveland, OH, US, vol. 46, Nr. 7, pp. 50, 52, 56.

(Continued)

*Primary Examiner*—Hunter B. Lonsberry
(74) *Attorney, Agent, or Firm*—Staas & Halsey LLP

(57) ABSTRACT

In a home network to which a client device and a plurality of server devices are connected, using a web browser in a client device and determining whether the plurality of devices are devices which support protocols required by the client device, respectively. Accessing the plurality of devices and obtaining and receiving a corresponding Internet protocol address through a process for receiving a predetermined Internet protocol address for each of the accessed devices is a device which supports the desired protocols. Receiving an address determined by the client device for each of the accessed devices which does not support the desired protocols. Creating a device page for displaying the plurality of devices, by arranging the addresses on the web browser.

12 Claims, 3 Drawing Sheets

U.S. PATENT DOCUMENTS 6,324,267 B1     11/2001     Hraster et al.

FOREIGN PATENT DOCUMENTS

| JP | 9-298775 | 11/1997 |
|---|---|---|
| JP | 9-312646 | 12/1997 |
| JP | 10-117393 | 5/1998 |
| WO | WO 97/18636 | 5/1997 |

OTHER PUBLICATIONS

Corcoran, Peter M. et al. *Browser-Style Interfaces to a Home Automation Network* (Nov. 1997), IEEE Transactions on Consumer Electronics, IEEE Inc. New York, US, vol. 43, Nr. 4, pp. 1063-1069.

Williams, T. *Tools And Protocols Link Embedded Systems Over The Internet* (Aug. 18, 1997), Electronic Design, Penton Publishing, Cleveland, OH, US, vol. 45, Nr. 17, pp. 91-92, 96, 98.

Desbonnet, J. *System Architecture and Implementation of a CEBus/Internet Gateway* (Nov. 1997). IEEE Transactions on Consumer Electronics, IEEE Inc. New York, US, vol. 43, Nr. 4, pp. 1057-1062.

Lawton, G. *Dawn of the Internet Appliance* (Oct. 1997), Computer, IEEE Computer Society, Long Beach, CA, US, vol. 30, Nr. 10, pp. 16, 18.

Que Corporation, Windows 95 Installation and Configuration Handbook, 1995, pp. 334-338, 408.

http://support.microsoft.com/default.aspx?scid=KB;en-us;298837&, Microsoft Corporation.

http://www.sipixdigital.com/support/Common/conn_trouble.pdf, Foxlink Peripherals, Inc.

http://gtweb.net/faq-a.html, 1997 General Technics.

European Patent Office Search Report dated Nov. 6, 2003 in the European Patent Application No. 99303439.6-1525, 4 pages.

U.S. Notice of Allowance mailed Feb. 10, 2005 in U.S. Appl. No. 09/306,203.

U.S. Office Action mailed Dec. 23, 2003 in U.S. Appl. No. 09/306,203.

U.S. Office Action mailed Jun. 6, 2003 in U.S. Appl. No. 09/306,203.

U.S. Office Action mailed Dec. 18, 2002 in U.S. Appl. No. 09/306,203.

U.S. Office action mailed Jul. 5, 2002 in U.S. Appl. No. 09/306,203.

\* cited by examiner

APPARATUS FOR AND METHOD OF CREATING A DEVICE PAGE FOR A DEVICE WHICH DOES NOT SUPPORT A PREDETERMINED PROTOCOL ON A HOME NETWORK

CROSS-REFERENCE TO RELATED APPLICATIONS

This application is a continuation application of U.S. application Ser. No. 09/306,403 filed May 6, 1999, the disclosure of which is incorporated hereby by reference.

This application claims the benefit of Korean Application No. 98-16143, filed May 6, 1998, in the Korean Patent Office, the disclosure of which is incorporated herein by reference.

BACKGROUND OF THE INVENTION

The present invention relates to a home network, and more particularly, to a method of creating a device page when connecting a device which does not support a predetermined protocol to a home network. Recently, various digital devices, such as digital TVs (DTV), digital video cameras (DVC), digital video disk players (DVDP), digital set top boxes, etc. have become popular. The IEEE 1394 standard approved by the IEEE committee is attracting attention as a digital network interface to establish a home network connecting these devices. Generally, every home appliance provides a method of allowing a user to control various functions using control buttons or a remote controller.

Control between devices meeting the IEEE 1394 standard is made using control commands. The most representative control command is an AV/Control Command and Transaction Set (AV/C CTS). For such inter-device control, the functions of each device are defined by hexadecimal codes. For example, the play command for a VCR is defined as "0xC8".

In a digitized home network system using the IEEE 1394 network, inter-device control is made by organizing one device (the subject of control) as a control device and a plurality of devices, (targets of control) as object devices. This type of home network system has the following defects. First, the single control device must know all the command sets of the object devices, which causes a considerable software and hardware burden. Second, the control device only knows commands in existence at the time when the product is manufactured. Thus, the control device cannot control new object devices. Third, it is difficult to provide a graphical user interface (GUI). That is, it is difficult to basically define unified GUI which can be applied to all kinds of devices, also there is a limit in defining the GUIs by groups of products.

A method to solve these problems by removing spacial restrictions in manipulating various devices and effectively display a variety of information by adopting web servers in devices adopting the IEEE 1394, has been studied. Basically, an IEEE 1394 device having a display device such as a DTV or a PC includes a web browser, enabling control of IEEE 1394 devices which include a web server. The web browser produces a device page with links to the IEEE 1394 devices with web servers. However, when a device, not supporting the Internet protocol (IP), or a device, supporting only specific IP protocols defined by a home network manufacturer, has been connected to a home network, no methods or apparatus for treating such device have been proposed.

SUMMARY OF THE INVENTION

To solve the above problem, it is an objective of the present invention to provide a method of creating a device page which allows a user to discriminate devices not supporting a predetermined protocol, and which allows the user to appropriately deal with devices not supporting predetermined protocols connected to a home network.

Accordingly, to achieve the above objective, there is provided a device page creating method using a web browser in a client device, in a home network to which a client device and a plurality of server devices are connected, the method comprising the steps of: determining whether the plurality of devices are devices which support protocols required by the client device, respectively, by accessing the plurality of devices; obtaining and receiving a corresponding Internet protocol address through a process for receiving a predetermined Internet protocol address, if each of the accessed devices is a device which supports the desired protocols, and receiving an address determined by the client device if each of the accessed devices is a device which does not support the desired protocols; and creating a device page for displaying the plurality of devices, by arranging the addresses on the web browser.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

A digitized home network environment comprised of IEEE 1394 apparatuses, and the protocol stack of a device including a web server, will first be described in brief.

Figure 1:
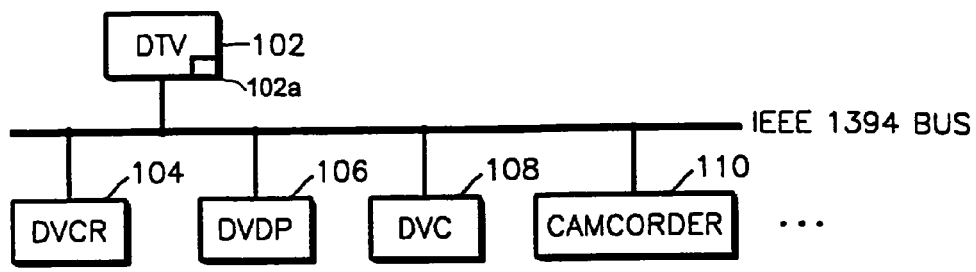
FIG. 1 is a block diagram of a home network environment.

FIG. 1 is a block diagram of a home network environment. A DTV 102, a DVCR 104, a DVDP 106, a DVC 108, a camcorder 110, etc. are all connected to each other via an IEEE 1394 bus, creating a home network system. Here, the DTV 102 (or another display device such as a PC) includes a storage medium 102a storing programs and data, described hereinbelow, including a web browser and operates as a client device. The DVCR 104, the DVDP 106, and the DVC 108 each include a web server and operate as server devices.

Figure 2:
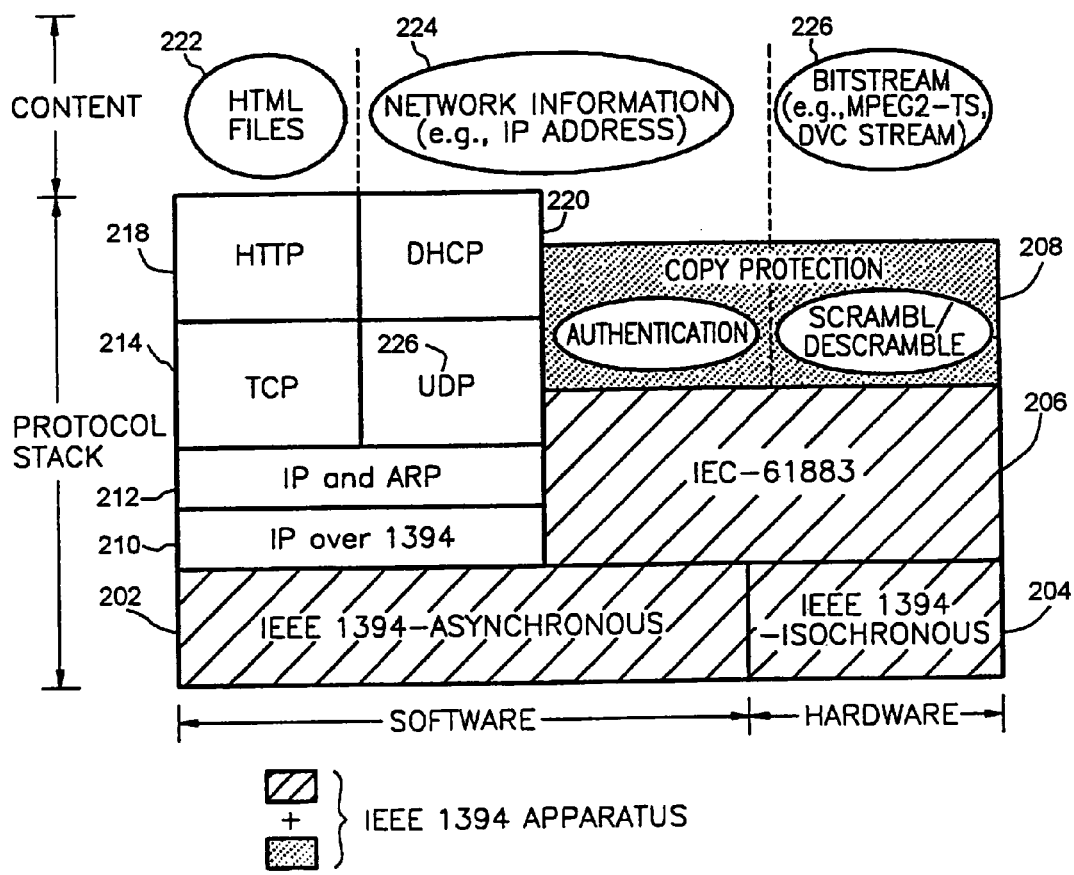
FIG. 2 is a diagram of a protocol stack of a device operating as a web server.

FIG. 2 is a diagram of a protocol stack of a device, such as the DVCR 104, the DVDP 106, and the DVC 108, operating as a web server. Referring to FIG. 2, the shaded portions of the stack are included in the IEEE 1394 apparatus, but the copy protection portions are optional. More specifically, the IEEE 1394 protocol uses an asynchronous layer 202, an isochronous layer 204 and an IEC-61883 layer 206. A copy protection layer 208 is optional. The IEEE 1394 apparatus can operate as a web server on the Internet by stacking an IP over the IEEE 1394 layer 210, and including an IP and address resolution protocol (ARP) layer 212, a transmission control protocol (TCP) layer 214 and a user datagram protocol (UDP) layer 216. The IEEE 1394 apparatus operates as a hypertext transfer protocol (HTTP) server, i.e., a web server, using an HTTP layer 218 and has a hypertext markup language (HTML) text hierarchy, for providing access to control functions, stored in HTML files 222. Associated graphic, sound, video, etc. files are stored in the bitstream section 226. A user can control devices having web servers by accessing the web pages using a web browser included in a client device, such as the DTV 102.

Referring back to FIG. 1, the DTV 102 (a client device) makes a device page by displaying an indication (such as an icon) for all server devices connected to a home network whenever there is a state change caused by a bus reset (including powering on of a device). Each of the server devices has a unique bitmap file or unique icon file, stored in the bit stream section 222 (FIG. 2), which represents the device itself. These files can be used by a client device having a web browser to construct a device page which displays devices connected to the IEEE 1394 network. Here, each icon, shown by the web browser on the screen of the client device, is connected to the uppermost level HTML page (or "home page") of each of the server devices according to a created device page.

Referring also to FIG. 2, the respective unique IP addresses are stored in a network information section 224 of each server device. The IP addresses for all devices connected to the home network may be called, and the unique icon files for all the devices are read from the addresses, to produce the device page. Here, the client device and the server devices support both the Internet protocol (IP) and a specific protocol defined by a home network manufacturer, such as Dynamic Host Configuration Protocol (DHCP 220), so that the client device can receive the icon files from each of the server devices. That is, the client device and the server devices support IP and HTTP, and if necessary DHCP.

However, for example referring to FIG. 1, if the camcorder 110, connected to the home network via the IEEE 1394 bus, satisfies only the IEEE 1394 standard and does not have a web server (no HTTP), it will be difficult to display the camcorder 110 as an icon when the client device creates a device page using a web browser. Or, if the camcorder 110 does not support the specific protocol defined by the home network manufacturer (DHCP), even though it includes a web server, it also will be difficult to display the camcorder 110 as an icon.

A device page creating method according to the present invention to solve the above problems will now be described as follows.

Figure 3:
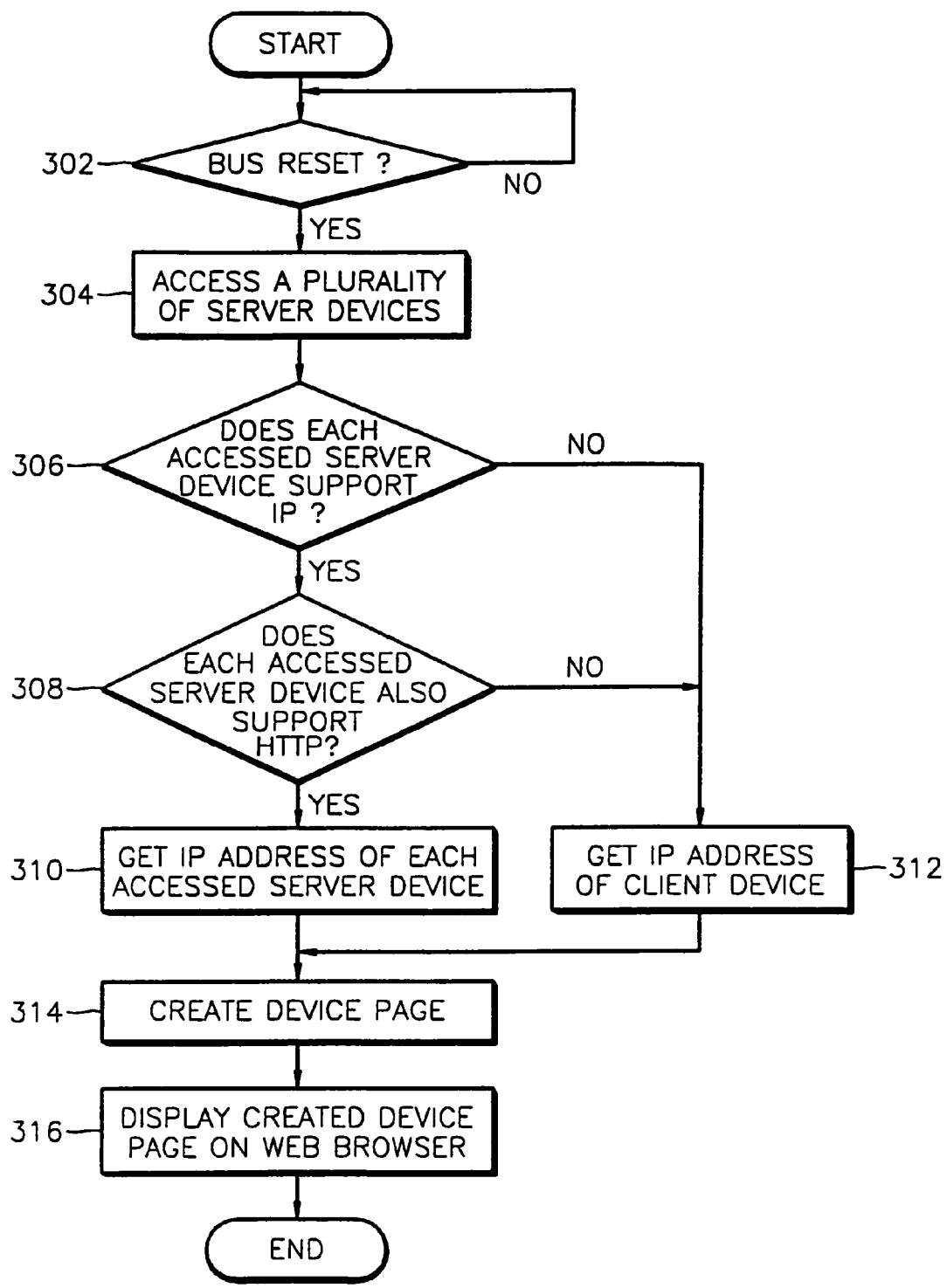
FIG. 3 is a flowchart of a method of creating a device page, according to the preferred embodiment of the present invention.

FIG. 3 is a flowchart of a method of creating a device page, according to the preferred embodiment of the present invention. Since the device page is produced whenever the bus is reset, first, a determination of whether a bus is reset is made in step 302. Upon detection of a bus reset, a client device (DTV 102 of FIG. 1), having a web browser, starts the process of producing a device page. In step 304, a plurality of server devices, connected to a home network, are accessed to obtain their IP addresses. Typically, the IP addresses of server devices are obtained through a process of receiving predetermined IP addresses. The web browser reads an icon file, e.g., "icon.gif", from each of the IP addresses, to present a user with recognizable icons. However, when a device not supporting the IP and HTTP is detected, a separate treatment process is required.

Thus, in step 306, a plurality of server devices are accessed to determine whether the devices support IP. A determination of whether the accessed server devices observe the IP over the 1394 standard can be made by reading a network channel register (NCR), i.e., by performing an asynchronous reading transaction. If in step 306 each device supports IP, it is determined whether each of the accessed server devices supports the HTTP in step 308. Here, the determination of whether the accessed server devices support the HTTP can be made, for example, by reading a predetermined register pre-defined in a control and status register (CSR) area to discriminate a device satisfying a protocol desired by a home network manufacturer. Alternatively, this determination can be made by demanding a specific file (e.g., an attribute file) from each of the server devices via the HTTP and then checking the response of the server devices.

If, in step 308, each device also supports HTTP, the IP addresses of the accessed server devices are obtained through the process for receiving a predetermined IP address, since each of the accessed server devices supports the desired protocols in step 310. For example, the IP address can be obtained from the accessed server devices, or can be pre-allocated in the client device. Alternatively, new addresses can be allocated. Meanwhile, for server devices not supporting the IP (determined in step 306) and those not supporting the HTTP (determined in step 308), the client device obtains IP addresses, for each such device, in step 312. That is, addresses set by the client device are obtained. After step 310 or 312, the web browser produces a device page for displaying a plurality of server devices, by arranging the obtained addresses in step 314.

Next, in step 316, a web browser shows the produced device page on the web browser at a predetermined condition time. Here, server devices having unique IP addresses are displayed as unique icons obtained by the addresses, but devices having no unique IP addresses are displayed as default icons pre-programmed in the client device.

Figure 4:
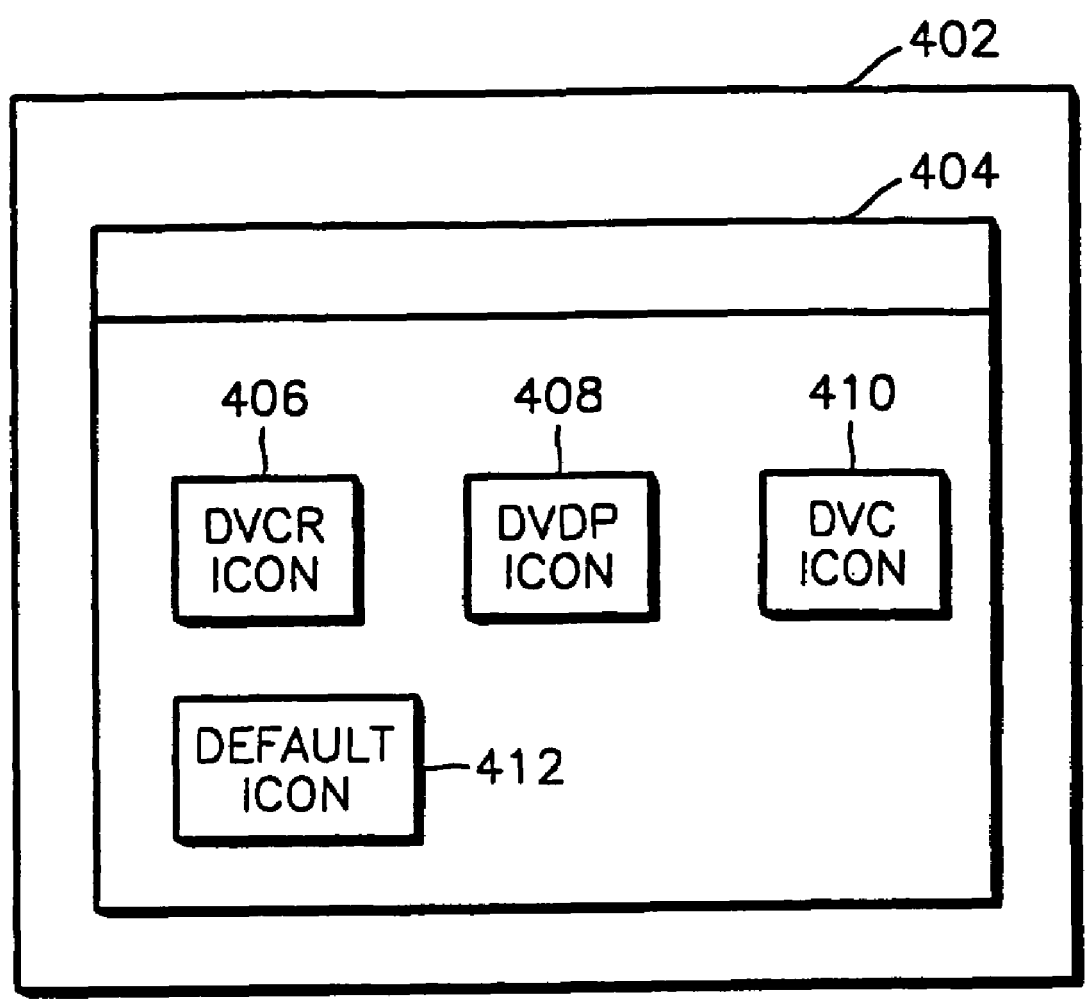
FIG. 4 is a diagram of a device page produced by the method of creating a device page according to the preferred embodiment of the present invention.

FIG. 4 is a diagram of a device page produced by the method of creating a device page according to the preferred embodiment of the present invention. Referring to FIG. 4, a web browser screen 404 is shown on a display screen 402 of, for example, a DTV operating as a client device, and icons 406, 408 and 410 of a plurality of server devices connected to a home network are shown according on a device page. For example, if the camcorder 110 of FIG. 1 does not support IP, a default icon 412, prepared in the client device, as shown in FIG. 4 is displayed and the camcorder 110 is treated as an unknown device.

If a user selects the DVCR icon 406, the web browser is connected to the uppermost level HTML page (home page) of the DVCR 104, acting as a web server, and reads the content from the page. However, if the user selects the default icon 412, the web browser is connected to a pre-programmed default page (should one exist), stored in the storage medium 102a on the client (DTV 102), and the content of a default page are displayed. That is, information on the unknown device to be displayed on a device page is possessed by the client device. If the client device does not have display information for a device, a message will inform the user that the device having the default icon cannot be accessed by the client.

In the case of devices which can be recognized by the client device because of their pre-stored display information, the client device provides a control command usage by means of a remote controller to the default page so that a user can control the basic functions of the devices by executing control commands such as an existing AV/C CTS.

The above-described embodiment of the present invention can be written by a program which can be executed by a specific purpose computer or a general purpose digital computer which operates the program from a computer readable media used in the computer. Such computer readable media can include storage media such as a variety of memory chips (e.g., RAM, ROM, DRAM, etc.), a magnetic storage medium (e.g., floppy disks, hard disks, etc.), an optical reading medium (e.g., CD-ROMs, DVDs, etc.), and carrier waves (e.g., transmission through Internet or other network protocol).

The recording medium stores program codes for allowing some steps to be performed in a computer, for example: determining whether a plurality of devices are devices which support protocols required by a client device, by accessing the plurality of devices; obtaining corresponding IP addresses through a process for receiving a predetermined IP address, if each of the accessed devices is a device which supports the desired protocols, and obtaining an address set by the client device if each of the accessed devices is a device which does not support the desired protocols; and creating a device page for displaying the plurality of devices, by arranging the addresses on a web browser. The program may be coded so as to determine whether the accessed device is a device which supports the IP, by reading the network channel register of the accessed device, as in the determination step, and to make another determination of whether the accessed device is a device which supports a protocol defined by a home network manufacturer, by reading a pre-defined specific register, if the accessed device is the device which supports the IP.

Functional programs, codes, and code segments for accomplishing the present invention can be created by programmers skilled in the art to which the present invention pertains without undue experimentation.

In the device page creating method according to the present invention as described above, when a device not supporting predetermined protocols is connected to a home network, devices not supporting predetermined protocols are identified, to allow a user to discriminate such a device and to support the user in coping with the unsupported device.

What is claimed is:

1. A method for using a web browser in a client device connected to a home network, the method comprising:

identifying and accessing a plurality of devices connected to the home network;

reading predetermined registers of each device and/or demanding a predefined file from each device;

determining according to the reading and/or the demanding whether the plurality of devices connected to the home network use upper layer Internet protocols supported by the client device;

obtaining and receiving an Internet protocol address of each device which supports the client device upper layer Internet protocols;

assigning a default Internet protocol address determined by the client device for each device which does not support the client device upper layer Internet protocols; and creating a web browser device page displaying indications for each device as to whether or not the device supports the client device upper layer Internet protocols.

2. The method as claimed in claim 1, wherein devices having Internet protocol addresses are displayed as unique icons and devices not supporting the protocols are displayed as default icons stored on the client device.

3. The method as claimed in claim 2, wherein when the user selects a default icon, the client device provides to the user a pre-determined web page allowing the user to control the device.

4. The method as claimed in claim 2, wherein when the user selects the default icon, if the client device does not have a corresponding web page for the device, a message is displayed stating that the device cannot be controlled.

5. A web browser enabled client device for a local area device network comprising:

software supporting an Internet protocol stack over an underlying protocol;

a local area device network connection that connects devices to the client device via the underlying protocol;

a storage medium that stores information about non-compliant devices that do not support the Internet protocol stack; and a web browser program accessing the devices connected to the network connection, reading predetermined registers in the devices and/or demanding a predefined file from each device, and determining according to the read registers and/or the demand if the connected devices are compliant devices which use the IP protocol stack supported by the client device or non-compliant devices, wherein for non-compliant devices the program accesses the storage medium to assign default Internet protocol addresses and determines if control information about such non-compliant devices exists, and when control information exists the program uses the control information to control the non-compliant device and when control information does not exist the program creates a web browser display page displaying an indication that control is not possible.

6. The client device, as set forth in claim 5, wherein at least one of the devices is a server device which allows control thereof via a web page served to the client device.

7. The client device, as set forth in claim 5, wherein the client device is a Television.

8. The client device, as set forth in claim 7, wherein at least one device is a VCR.

9. The client device, as set forth in claim 5, wherein the storage medium stores pre-defined web pages for non-compliant devices for which information is stored, the web pages allowing access to control functions.

10. The client device, as set forth in claim 9, wherein the web browser creates a top level page using icons provided by each compliant device and default icons stored in the storage medium for each non-compliant device.

11. The client device, as set forth in claim 10, wherein when a user selects an icon of a compliant device, the browser access the top-level page stored and served by the compliant device and when the user selects an icon of a non-compliant device, the browser accesses the pre-defined non-compliant device web pages stored in the storage medium.

12. The client device, as set forth in claim 11, wherein the storage medium stores a pre-defined non-compliant device web page indicating that control is not possible, if the user selects an icon associated with a non-compliant device for which information is not stored in the storage medium.

* * * * *

UNITED STATES PATENT AND TRADEMARK OFFICE
CERTIFICATE OF CORRECTION

PATENT NO. : 7,644,430 B2 Page 1 of 1
APPLICATION NO. : 11/124110
DATED : January 5, 2010
INVENTOR(S) : Il-Ju Na It is certified that error appears in the above-identified patent and that said Letters Patent is hereby corrected as shown below:

On the title page: under
"Related U.S. Application Data

(63) Continuation of application No. 09/306,403, filed on May 6, 1999, now Pat. No. 6,993,785." insert
--(30)  Foreign Application Priority Data

May 6, 1998 (KR)................98-16143--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,644,430 B2　　　　　　　　　　　　　　　　　　　　　Page 1 of 1
APPLICATION NO. : 11/124110
DATED : January 5, 2010
INVENTOR(S) : Il-ju Na It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Twenty-first Day of December, 2010

David J. Kappos
*Director of the United States Patent and Trademark Office*